United States Patent Office 3,840,681
Patented Oct. 8, 1974

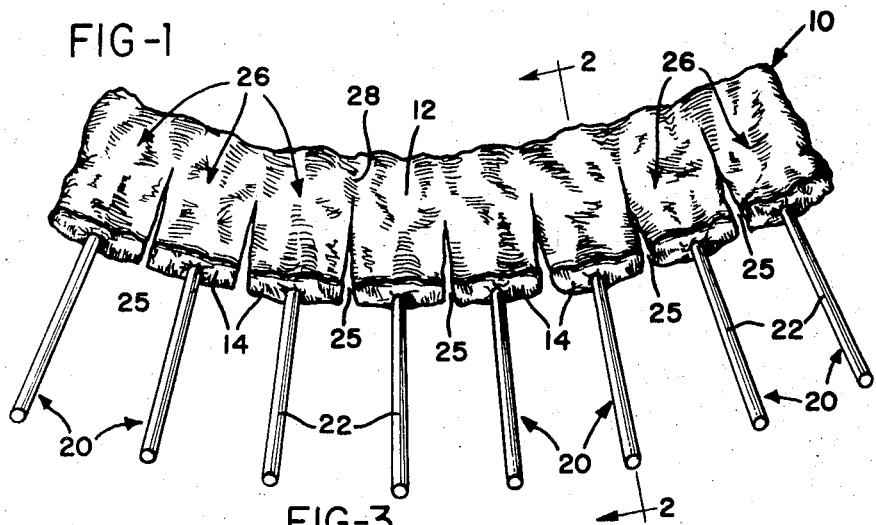
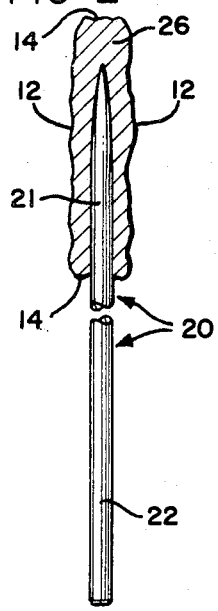
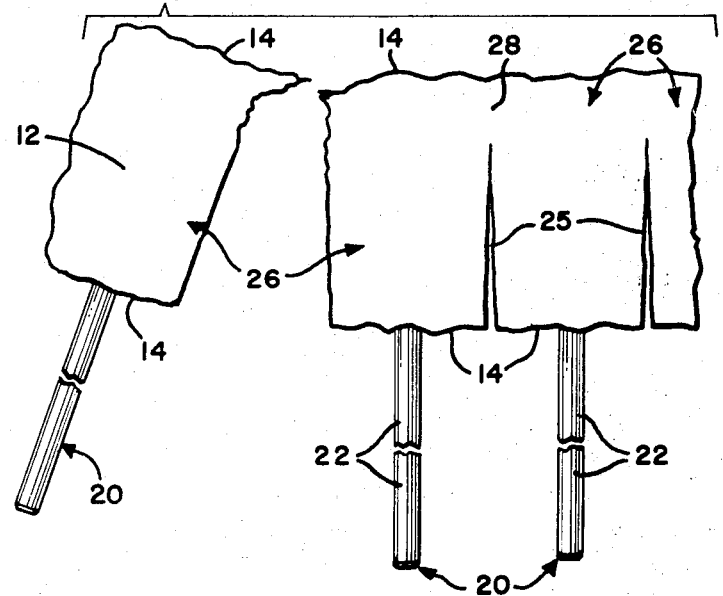
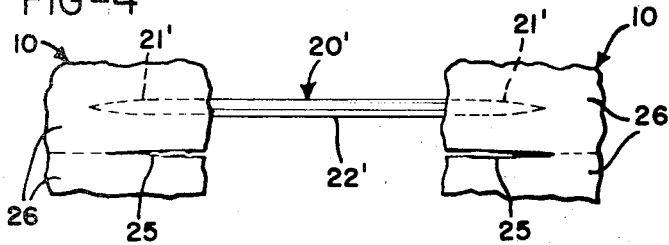

3,840,681
MEAT PRODUCT
Joseph L. Bissett, 1410 N. Main St.,
Dayton, Ohio 45405
Continuation of application Ser. No. 200,851, Nov. 22, 1971, now Patent No. 3,717,473, which is a division of application Ser. No. 825,150, May 16, 1969, now Patent No. 3,635,732. This application Feb. 16, 1973, Ser. No. 333,397
The portion of the term of the patent subsequent to Jan. 19, 1989, has been disclaimed
Int. Cl. A22c 18/00
U.S. Cl. 426—134        2 Claims

ABSTRACT OF THE DISCLOSURE

A strip of lean meat is cut from a loin so that the width of the strip is substantially greater than its thickness, and a plurality of generally parallel skewers are inserted into the strip at longitudinally spaced intervals and provide handle portions projecting from one of the edge surfaces of the strip. Transverse slits are formed within the strip between the skewers and extend from one edge surface toward the other edge surface to provide connected strip sections on the skewers.

RELATED APPLICATION

This application is a continuation of application Ser. No. 200,851, filed Nov. 22, 1971, now U.S. Pat. No. 3,717,473, which is a division of Ser. No. 825,150, filed May 16, 1969 and now issued as Pat. No. 3,635,732.

BACKGROUND OF THE INVENTION

In the preparation of servings of meat products, it is common to insert a wooden stick or skewer into one or more pieces of meat or into a molded form of ground meat. Usually the lower end portion of the stick projects from the meat to form a handle which provides for eating the meat after it is cooked without the use of silverware. The various meat products of this type are commonly referred to as "city chicken," "shish-kebab" or a "hot dog on a stick." Another common meat product is prepared from the ribs section of a pork loin and is usually referred to as "barbecued spare ribs." Since only approximately 1⅓ servings of "barbecued spare ribs" can be obtained from an average size pork loin, the supply of servings is somewhat limited. Moreover, "barbecued spare ribs" are usually separated and eaten by gripping the ends of the ribs with the fingers, resulting in barbecue sauce being deposited on the fingers.

SUMMARY OF THE INVENTION

The present invention is directed to an improved meat product which is adapted to be eaten without the use of silverware and which is preferably formed from the lean tender portion of a pork loin. It is to be understood, however, that the meat product of the invention may also be formed from other meats such as beef tenderoin, ham steak and the like. Important features of the meat product of the invention are that it can be conveniently prepared and served in a barbecued form and can be conveniently handled with the fingers without depositing barbecue sauce on the fingers. The invention also provides a lean meat product in the form of a plurality of sections each of a size which can be conveniently inserted into the mouth without depositing barbecue sauce on the face.

In one embodiment, the meat product of the invention comprises an elongated strip of lean pork tenderloin. The strip has a rectangular cross-sectional configuration with opposite edge surfaces defining a width substantially greater than the thickness defined between the opposite side surfaces. A plurality of longitudinally spaced and generally parallel wooden sticks or skewers have pointed end portions which extend into the strip generally parallel to the side surfaces and have handle portions which project from one of the edge surfaces. Transverse slits are formed within the meat strip between the skewers and extend from the edge surface which receives the skewers toward the other edge surface. The slits extend approximately ¾ of the width of the strip to form a strip section for each of the skewers thereby facilitating separation of adjacent strip sections by simply separating the handle portions of the corresponding skewers.

BRIEF DESCRIPTION OF THE DRAWING

FIG. 1 is a perspective view of a meat product formed in accordance with the invention;

FIG. 2 is a section taken generally on the line 2—2 of FIG. 1;

FIG. 3 is a fragmentary plan view of the meat product shown in FIG. 1 and illustrating the separation of one of the strip sections; and FIG. 4 is a fragmentary plan view of a meat product forming another embodiment of the invention.

DESCRIPTION OF THE PREFERRED EMBODIMENTS

Referring to FIG. 1, an elongated filet strip 10 of meat such as pork tenderloin has opposite parallel side surfaces 12 and opposite parallel edge surfaces 14 which define a generally rectangular cross-sectional configuration (FIG. 2). The width of the strip as defined between the edge surfaces 14 is substantially greater than the thickness of the strip as defined between the side surfaces 12. For example, the strip may have a width of approximately two inches and a thickness of approximately ⅜ inch to ½ inch.

In a preferred form, the meat strip 10 is sliced from a pork loin so that the strip consists of lean meat with substantially no fat and the grain of the meat extends substantially longitudinally of the strip. The strip 10 may also be formed by rolling or folding a "Canadian back" which is the lean portion used to produce "Canadian bacon," and slicing the "back" into strips 10 with the aid of a power meat slicer.

A plurality of wooden sticks or skewers 20 have pointed end portions 21 which are inserted partially (FIG. 2) into the meat strip 10 at longitudinally spaced intervals from one of the edge surfaces 14 so that the sticks 20 extend substantially parallel to the side surfaces 12 of the strip. Each of the sticks 20 include a handle portion 22 which projects from the edge surface 14, and the length of the handle portion 22 of each stick 20 is substantially greater than the length of its end portion 21 so that the handle portion can be firmly gripped in a hand. As shown in FIG. 2, the sticks 20 are arranged in substantially parallel relation in a common plane.

A plurality of longitudinally spaced slits 25 are formed within the strip 10 between the skewers 20 and extend transversely from the edge surface 14 which receives the skewers 20 toward the opposite edge surface 14. The slits 25 extend at least halfway through the width of the strip 10 and preferably about ¾ of the width, and form the strip 10 into a plurality of strip sections 26, one section for each of the skewers 20. The strip sections 26 thus remain integrally connected by an edge portion 28 of the strip 10.

The meat product shown in FIG. 1 represents an individual serving of barbecued pork tenderloin after it is cooked. Preferably, this serving is prepared by first inserting the skewers 20 into one of the edge surfaces 14 of the strip 10 which is then seasoned and basted with a suitable cooking oil. The meat strip 10 is broiled by exposing both side surfaces 12 to sufficient heat for cooking the strip within approximately ten mnutes.

After the meat strip 10 is cooked, it is basted with a heated barbecue sauce, and the slits 25 are formed within the strip between the skewers. The meat product is then ready for serving to a customer who can conveniently separate adjacent meat strip sections 26 merely by gripping the handle portions 22 of adjacent skewers 20 and separating the skewers thereby tearing the edge portion 28 of the meat strip adjacent the inner end of the intermediate slit 25.

Referring to FIG. 4 which shows another embodiment of the invention, two strips 10 of meat are each formed into strip sections 26 by longitudinally spaced slits 25, and each pair of corresponding strip sections 26 are pressed onto opposite pointed end portions 21' of a corresponding skewer 20'. The intermediate handle portions 22' of the skewers 20' provide for handling and serving the meat strips 10 and for severing adjacent strip sections 26 on the ends of the adjacent skewers 20'. The strip sections 26 on opposite ends of each skewer 20' may be conveniently eaten while gripping the intermediate handle portion 22'.

From the drawing and the above description, it is apparent that a meat product produced in accordance with the invention provides desirable features and advantages. For example, by converting a meat strip 10 into a plurality of strip sections 26 which remain connected along the edge portion 28 and by providing each strip section 26 with a skewer 20, the meat strip 10 can be conveniently handled during preparation, cooking and serving and can also be conveniently eaten without the use of silverware simply by tearing each strip section 26 from an adjacent strip section by gripping and separating the handle portions of the corresponding skewers 20.

Furthermore, the size of each strip section 26 is such that it can be easily inserted into the mouth, and the handle portion 22 of each skewer 20 has sufficient length so that the meat strip sections 26 can be eaten without depositing barbecue sauce on the fingers. Moreover, the grain of the meat of each strip section 26 extends generally normal to the corresponding skewer 20 so that a bite-size portion of the strip section can be easily removed from the skewer with one's teeth without removing the remaining portion from the skewer.

Another important feature is provided by forming the meat strip 10 so that its width is substantially greater than its thickness an by extending the skewers 20 into the meat strip 10 across its width. This permits the meat strip 10 and the projecting skewers 20 to be placed on a grill with one of the side surfaces 12 facing the heat source and then be inverted after a predetermined cooking time so that the opposite side surface faces the heat source. As a result, the meat strip can be quickly cooked, and in addition, the slits 25 can be easily formed within the meat strip 10 after it is cooked.

While the method and forms of meat product herein described constitute preferred embodiments of the invention, it is to be understood that the invention is not limited to these precise method and forms of meat products, and that changes may be made therein without departing from the scope and spirit of the invention. For example, it is within the scope of the invention to extend the skewers 20 completely through the corresponding strip sections 26 so that a handle portion is provided adjacent each edge surface 14. As another example, it is within the scope of the invention to alternate the arrangement of the skewers 20 so that some of the skewers 20 project from each of the edge surfaces 14.

What is claimed is:

1. A meat product comprising an elongated filet strip of meat having generally parallel opposite side surfaces and generally parallel opposite edge surfaces, the width of said strip defined between said edge surfaces being substantially greater than the thickness of said strip defined between said side surfaces and the length of said strip being substantially greater than said width, a plurality of longitudinally spaced elongated skewers each including a first portion extending laterally partially into said strip from one of said edge surfaces and generally parallel to said side surfaces, each said skewer further including a handle portion projecting from said one edge surface to provide for conveniently handling said product during cooking and serving, said strip being adapted to be cut between said skewers laterally from one edge surface towards the other edge surface to define a filet section for each of said skewers to provide for convenient separation and eating of said filet sections with the corresponding said skewers.

2. A meat product as defined in claim 1 wherein said filet strip of meat comprises a substantially lean strip of pork loin.

References Cited

UNITED STATES PATENTS 2,609,564    9/1952    Grimm _____ 99—107 X

HYMAN LORD, Primary Examiner

U.S. Cl. X.R.

426—132, 149, 212, 518